June 30, 1970
D. R. STEWART ET AL
3,517,659
APPARATUS FOR AUTOMATICALLY DRESSING A
GRINDING WHEEL CONTOUR
Original Filed Dec. 5, 1966
3 Sheets-Sheet 1
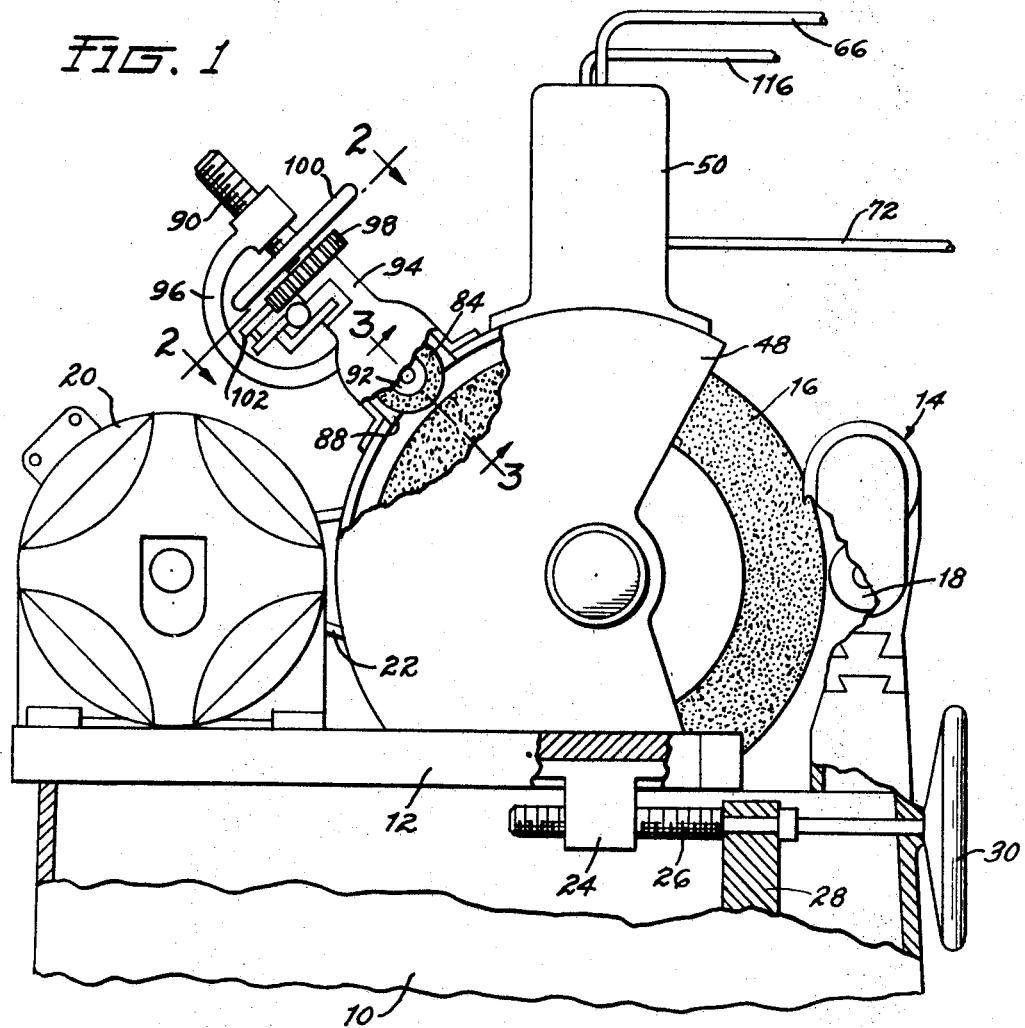
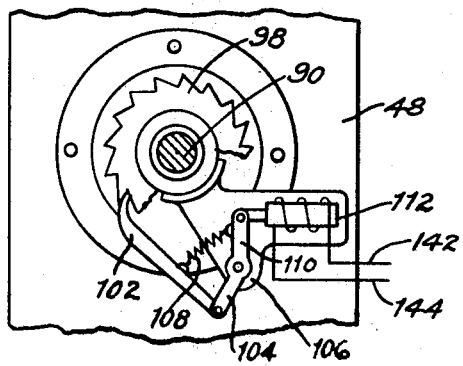
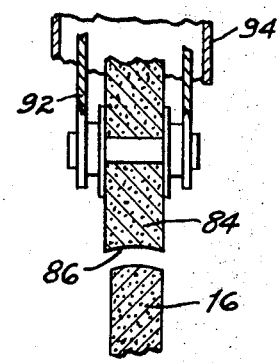
INVENTOR.
DONALD R. STEWART +
ELLIS D. KANE.
By Wallace P. Lamb
ATTORNEY.

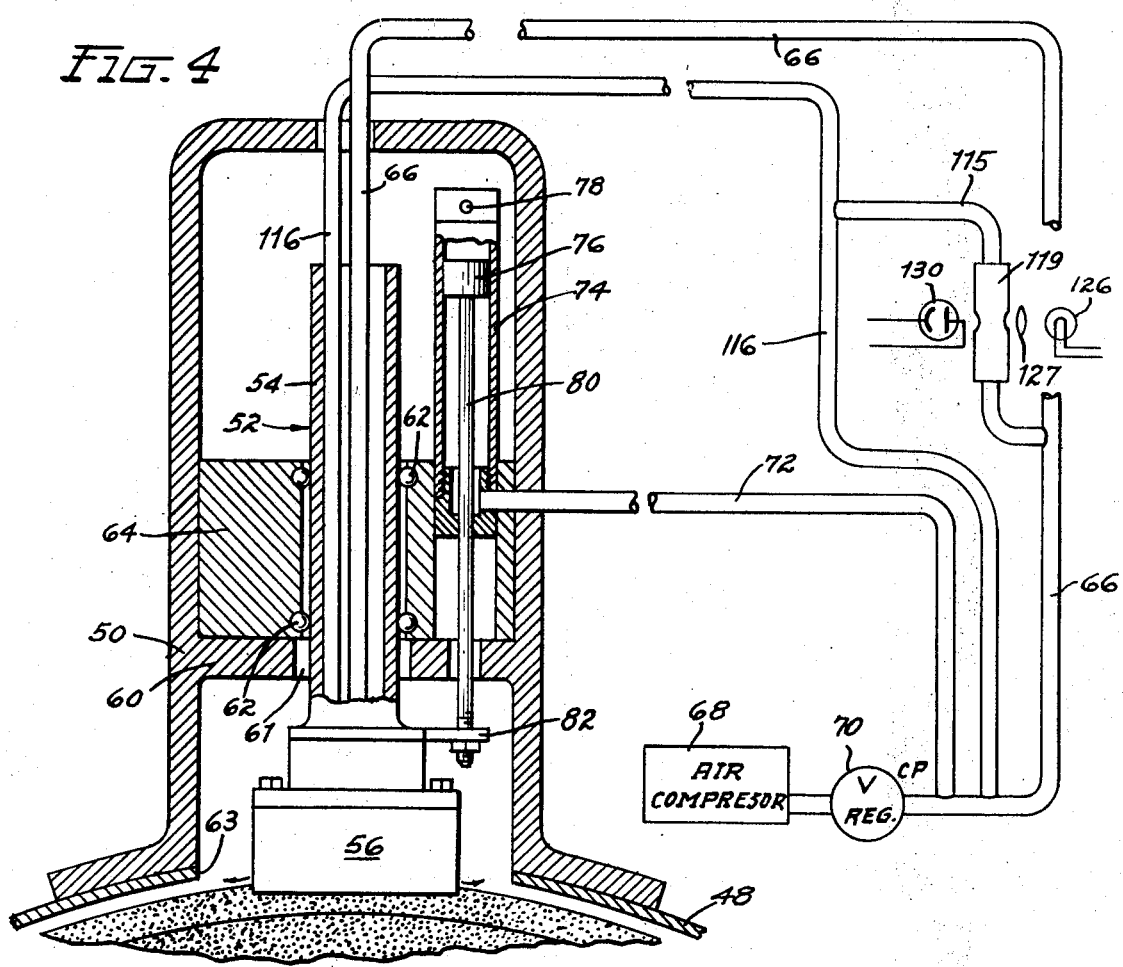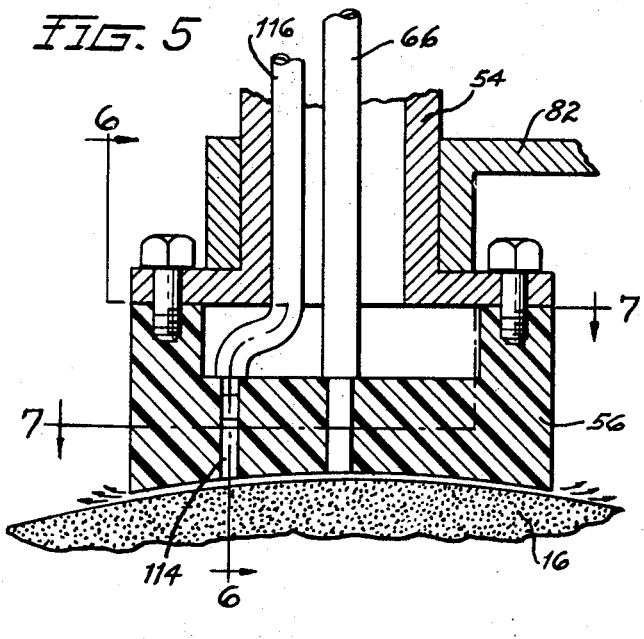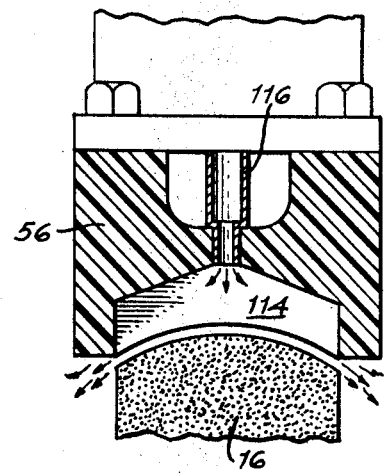

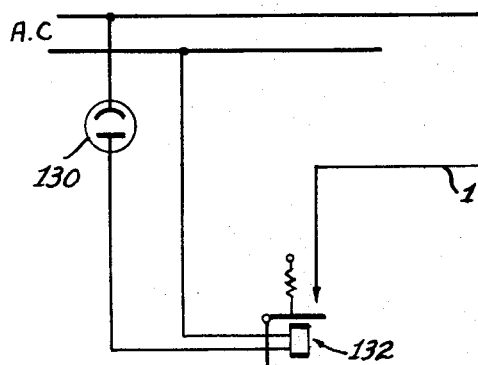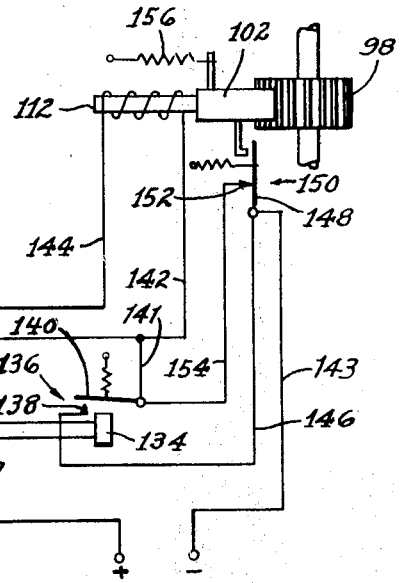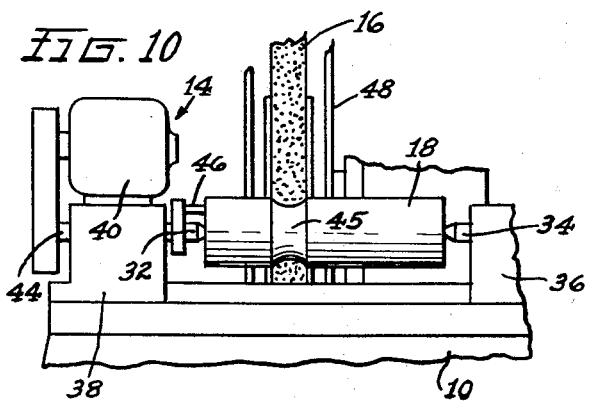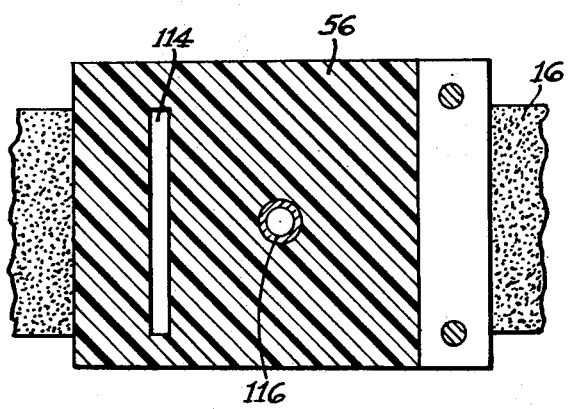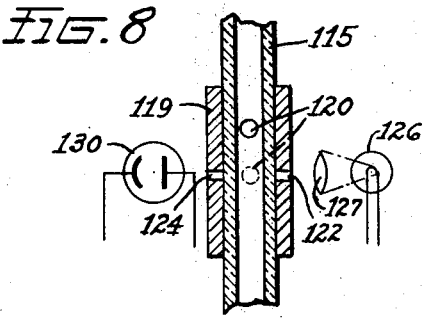

United States Patent Office 3,517,659
Patented June 30, 1970

3,517,659
APPARATUS FOR AUTOMATICALLY DRESSING A GRINDING WHEEL CONTOUR
Donald R. Stewart and Ellis D. Kane, Detroit, Mich.; said Kane assignor to said Stewart, doing business as Stewart Instrument Company, Detroit, Mich.
Continuation of application Ser. No. 607,351, Dec. 5, 1966. This application May 1, 1969, Ser. No. 824,360
Int. Cl. B24b 53/04
U.S. Cl. 125—11                                   4 Claims

ABSTRACT OF THE DISCLOSURE

The disclosure embodies a dressing tool control system including a body mounted over the grinding contour of a grinding wheel proximate thereto and mounted for movement toward the grinding contour. A counterbalance in the form of a pressure responsive piston is connected to the movable body and is in communication with a source of constant pressure, and in the body and overlying the grinding surface of the grinding wheel there is an outlet port which is also in communication with the source of constant fluid pressure. As a consequence, the pressure at said outlet decreases as the diameter of the wheel decreases during a dressing operation allowing the body to move toward the wheel so as to maintain the distance between the movable body and the grinding contour at a predetermined substantially constant distance irrespective of decrease in the wheel diameter. A cavity in the body overlies the grinding contour of the wheel and is in communication with the source of constant fluid pressure, the pressure within the cavity decreases as the wheel grinding contour gradually loses its desired contour due to the grinding operation and when the pressure decreases to a predetermined low limit a pressure responsive switch activates the dressing tool to redress the grinding contour. As the contour is redressed, the fluid pressure in the cavity rises and at an upper limit opens the control switch to retract the dressing tool.

---

This is a continuation of my application Ser. No. 607,351, filed Dec. 5, 1966, and now abandoned.

Reference should be made to our related application, Ser. No. 545,363, filed Apr. 26, 1966 for improvements in abrading tool control systems.

As is well known, grinding wheels are used to grind contoured parts to size and in such cases the grinding wheel periphery has a contour which, of course, is complementary to the desired contour of the part. It is also well known that contoured grinding wheels do not wear uniformly due to variations in amount of material removed. As a result, it has been necessary in the past for a grinding wheel attendant to stop the apparatus, remove the part and check the contour of the part by means of a suitable gauge. If the gauge indicated the contoured part to be unsatisfactory, the attendant would ordinarily move a wheel dresser into engagement with the grinding wheel periphery to reshape the wheel and then remount the part for further grinding. This shutting down of the grinding operation, removal and checking of the part is obviously objectionable, particularly from the standpoint of production cost and it is the primary object of the invention to eliminate said objection.

More specifically, it is an object of the invention to provide a control system for a wheel dresser which will automatically activate the latter in response to a predetermined change in the contour of the periphery of an operating grinding wheel.

In connection with the above object, it is a further object of the invention to provide a wheel dresser control system which will automatically retract the dresser when the required contour of the grinding wheel periphery has been restored.

It is also the object of this invention to provide a measuring means that will measure the contour of a part by means of a fluid pressure contour responsive element.

Other objects of the invention will become apparent from the following detail description, taken in connection with the accompanying three sheets of drawings in which:

FIG. 1 is a fragmentary side view partly in section of a grinding wheel apparatus, embodying features of the invention;

FIG. 2 is a sectional view partly in elevation, taken along the line 2—2 of FIG. 1;

FIG. 3 is a fragmentary sectional view, taken along the line 3—3 of FIG. 1;

FIG. 4 is an enlarged vertical sectional view together with a diagrammatic illustration of a control system;

FIG. 5 is an enlarged fragmentary vertical sectional view;

FIG. 6 is a vertical sectional view, taken along the line 6—6 of FIG. 5;

FIG. 7 is a horizontal sectional view, taken along the line 7—7 of FIG. 5;

FIG. 8 is an enlarged vertical sectional view of a portion of the system of FIG. 4;

FIG. 9 is a diagrammatic illustration of an electrical control system, and

FIG. 10 is a fragmentary front view of the grinding machine.

Referring to the drawings by characters of reference, the grinding apparatus comprises, in general, a base 10, a movable table 12, a part or workpiece drive mechanism 14, and a grinding wheel 16. The workpiece drive mechanism 14 is mounted on the base 10 at the front of the machine and the grinding wheel 16 is mounted on the table 12 for movement against a metal workpiece 18. Also mounted on the table 12 there is an electric motor 20 for rotatably driving the grinding wheel 16 through a suitable drive connection, such as a belt drive 22.

The table 12 is slidably supported in guideways on the top of the base 10 and on the underside of the base there is an integral depending lug 24 which is internally threaded to receive a feed screw 26 for moving the grinding wheel against the workpiece 18. As shown in FIG. 1, the feed screw 26 is journaled for rotation in an inner upstanding wall 28 of the base 10 and in the front wall of the base. Adjacent the front wall of the base, the shaft of the feed screw 26 has a hand wheel 30 affixed thereto for manually rotating the screw 26. It will be understood by those skilled in the art that the grinding wheel 16 could be fed against the workpiece 18 by any other suitable means, such as the conventional hydraulic feed system, or by any other suitable system.

With reference to FIG. 10, the metal workpiece 18 is shown as being of cylindrical configuration, such as a shaft, and held at its ends between a pair of rotatable center pins 32 and 34. The pins 32 and 34 are rotatably journaled in a mounting block 36 and within a housing 38 respectively, the housing enclosing a speed reduction mechanism (not shown) which may be of a conventional gear reduction type. Mounted on top of the housing 38 there is an electric motor 40 connected by a belt or other suitable connection to the drive shaft 44 of the speed reduction mechanism. As illustrated in FIG. 10, the periphery of the grinding wheel 16 is contoured or rounded convexly to grind an annular groove 45 in the workpiece 18 as the workpiece is rotatably driven by the motor 40 through a drive pin 46.

The grinding wheel 16 is journaled for rotation in opposite sides of a supporting member and safety guard 48 which extends partway around the wheel periphery in the usual manner. Mounted on the web of the safety guard 48 there is a housing 50 which is preferably located directly above the axis of the wheel 16 and is in communication, through an opening in the guard member 48, with the periphery of the wheel.

Within the housing 50 there is a vertically movable head 52, which may comprise, in general, an open ended vertical sleeve 54 and a body 56. The sleeve 54 extends through a clearance hole 61 in an internal horizontal web 60 of the housing 50 and the body 56 is carried by the sleeve 54 on the lower end thereof. The body 56 is rigidly secured to a circumferential flange on the lower end of the sleeve 54 and projects through a clearance opening 63 in the web of the guard 48 in overlying relation to the periphery of the grinding wheel 16. As shown in FIG. 4, the sleeve 54 is mounted for vertical movement by ball bearings 62 in a mounting block 64 which is supported on the web 60 and rigidly secured to the housing 50 such that the head 52 is vertically movable toward and away from the wheel periphery. Preferably, the body 56 has its underside arcuately contoured such that it is complementary to the curvature of the grinding wheel periphery, as shown in FIG. 5.

Extending downwardly through the sleeve 54 there is an air conducting tube 66 the lower end of which opens through the arcuately formed underside of the body 56 centrally thereof. The tube 66 extends through a clearance opening in the top of housing 50 and connects to an air compressor 68. In the tube 66 there is a constant pressure regulating valve 70. Preferably, the tube 66 is made of a flexible or yieldable material to provide substantially unrestricted vertical movement of the head 52. Another flexible or yieldable air conducting tube 72 is connected in communication with the outlet of the pressure regulating valve 70 and conducts compressed air to the lower end of a cylinder 74 below a pressure responsive element or piston 76, the cylinder having an air bleed 78 at the upper end thereof. The cylinder 74 is rigidly mounted on the block 64 within the housing 50. A vertical connecting rod 80 connects the piston 76 to an arm 82 which is rigidly secured to the vertical sleeve 54 such that the piston 76 and the head 52 are movable together vertically. The compressed air system including the piston 76 constitutes a counterbalance for the weight of the head 52, the purpose being to maintain the body 56 at a substantially constant distance from the periphery of the grinding wheel 16 irrespective of decrease in the diameter of the wheel which occurs, of course, by wear. For example, as the diameter of the wheel decreases by wear, the pressure of the air stream striking the wheel periphery decreases accordingly with accompanying decrease in pressure in the air cylinder whereupon the head 52 moves down to compensate for wheel wear. From another aspect, it may be said that the air jet escaping from the lower open end of the tube 66 against the wheel periphery holds the head 52 spaced a predetermined distance from the wheel periphery which functions as a valve, the variable factor being the capacity of the pressurized air system which decreases as the piston 76 moves downwardly.

A grinding wheel dressing tool 84 is mounted on the web of the guard 48 and projects therethrough in overlying relation to the periphery of the wheel 16. The tool 84 is normally retracted, or is away from the wheel periphery and the cutting edge 86 of the tool is concave and complementary to the desired convex contour of the wheel periphery, as shown for example in FIG. 3. The tool 84 is mounted in a clearance opening 88 in the web of the guard 48 and is mounted on one end of a shank of a worm gear 90 by a clevis 92. An internally threaded tubular member 94 receives the worm gear 90 in mesh therewith and the tubular member is mounted at its lower end on the web of guard 48 such that the axis of the worm is radial to the axis of the grinding wheel 16. The tubular member 94 is constructed in two axially aligned sections connected together rigidly by a web 96, and between the opposed ends of said sections there is a ratchet wheel 98 affixed onto the worm gear shank. Also, a hand wheel 100 may be provided for manually adjusting the position of the dressing tool 84 relative to the grinding wheel 16, the hand wheel 100 being affixed onto the worm shank 89 between the tubular sections of the tubular member 94. A pawl 102, as shown in FIG. 2, is pivotally connected to an arm 104 of a lever which is pivoted on a bracket 106, mounted on the side of the tubular member 94. The free end of the pawl 102 is urged into engagement with a tooth of the ratchet wheel 98 by a coil spring 108. Another arm 110 of the pawl operating lever is connected to a power element or solenoid 112 shown in FIGS. 2 and 9. When energized, the solenoid 112 will operate the pawl 102 and rotate the ratchet wheel 98 whereby to advance the dressing tool 84 to the periphery of the grinding wheel 16.

In accordance with our invention, we provide for automatically maintaining the peripheral contour of the grinding wheel at a desired contour without interrupting productive operation of the wheel. To accomplish this we provide a control system for controlling operation of the wheel dressing tool 84 in response to a predetermined change by wear in the contour of the wheel pheriphery. The control system includes an air cavity 114 in the body 56 in communication with the constant regulated air pressure by a connecting tube 116. The air cavity 114 extends over the periphery of the wheel across the width thereof, as shown in FIG. 6 to form an air pressure chamber with the wheel periphery. In this chamber or cavity 114 the air pressure decreases as the contour of the wheel 16 changes by wear. A connecting tube 115 interconnects tubes 66 and 116 communicatively and interposed in the tube 115 there is a transparent section 118 wherein an indicator such as a ball 120 is supported by the air pressure, above horizontally aligned apertures 122 and 124 in an opaque sleeve 119, as long as the air pressure exceeds a predetermined pressure. That is, the ball 120 is supported above the aligned apertures 122 and 124 when the mean or average pressure of the sum of the pressures in tubes 66 and 116, representative of the wheel contour, is at a predetermined pressure. A light source or lamp 126 is provided opposite the aperature 122 and a lense 127 projects a light beam through the apertures 122 and 124 onto a photo electric cell 130 to hold a control relay 132 normally energized with the contacts open, as shown in FIG. 9. Connected in series circuit with the contacts of the control relay 132 is a coil 134 of a timer delay relay 136 having normally open contact members 138 and 140. The circuit includes a lead 135 from the positive side of a D.C. power source to the movable contact member of control relay 132 which has its fixed contact connected by leads 133 and 137 to one end of the delay relay coil 134. The other end of the delay relay coil 134 is connected by leads 139, 141 and 154 to a fixed contact member 152 of a switch 150 which has a normally closed movable contact member 148 connected by a lead 143 to the negative side of the D.C. power source. Thus, when the control relay 132 closes in response to deactivation of the photo cell 130, the relay coil 134 is energized to close its contact member 138 and 140. Also in series circuit with the contact members of the control relay 132 is the coil of the solenoid 112 which has one end connected to the fixed contact of control relay 132 by a lead 144 and the lead 133. The other end of the coil of solenoid 112 is connected by a lead 142 and by lead 141 to the movable contact member 140 of the delay relay 138 which has its fixed contact member 138 connected by a lead 146 and lead 143 to the negative side of the D.C. source. The switch member 148 is actuated by the pawl 102 to interrupt the circuit of the solenoid 112 so as to allow for retraction of the pawl 102 by a tension spring 156.

OPERATION

In operation, the motor 20 drives the grinding wheel 16 and motor 14 drives the workpiece 18 in which the annular groove 45 is to be ground. Also, air under pressure is being supplied through tube 66 against the periphery of the grinding wheel 16 to maintain the vertically movable head 52 counterbalanced so that the lower contoured face of the body 56 is maintained at a substantially constant predetermined distance from the complementarily contoured face of the grinding wheel periphery. Further, air under pressure is supplied by the tube 116 to the cavity 114 in the body 56 and escapes from the lower side, front and rear edges of the cavity, as indicated by the arrows. The purpose of directing air pressure at the crown of the wheel periphery is to compensate for decrease in wheel diameter due to wear. The purpose of the air pressure in the cavity 114 is to reflect an undesirable change in contour in the grinding wheel which wears irregularly particularly at the side edges with resultant decrease in air restricted flow from the cavity with accompanying decrease in cavity air pressure. This is indicated by descent of the pressure responsive ball 120 which in time descends to the point where it intercepts the light beam, causing the photo electric cell 130 to become deenergized. The deenergization of the photo electric cell 130, deenergizes the control relay 132 which closes its contacts and energizes the time delay relay 136, which in turn energizes the solenoid 112. The solenoid now actuates the pawl 102 to rotate the ratchet wheel 98 so as to advance the dressing tool 84 against the periphery of the grinding wheel to start the reshaping operation. The dressing tool 84 will be pressed against the grinding wheel periphery until the pawl 102 about completes its stroke whereupon the pawl opens the switch 150 which breaks the circuit of the solenoid 112 so as to allow the spring to retract the pawl 102. Retraction of the pawl 102 resets the switch 150 to again cause the solenoid 112 to be energized and this will be repeated until the time delay relay 136 times out. The delay relay 136 is set so there is enough times for each stroke of the pawl to dress the wheel. As the contour of the grinding wheel is being reshaped, the air pressure in the cavity 114 is correspondingly increasing which raises the mean or average air pressure in tube 115 and consequently raises the indicator ball 120. When the ball rises so as to clear the light beam, the relays are reset to their normal positions shown.

A broader aspect of our invention will be seen in our provision of an improved method and apparatus for measuring the uniformity of the contour of a part or workpiece without the use of hardware type measuring devices in contact with the workpiece. Instead we rotate the workpiece and direct a fluid at the contour to be measured with a regulated constant pressure indicative of the desired contour whereby a change in contour is indicated by a corresponding decrease in fluid pressure to which an indicator or switch 132 may be connected. Instead of having the switch 132 initiate automatically the dressing operation by the wheel 84, the switch could activate an alarm, or a pressure response device or bellows (not shown) responsive to a pressure decrease in tube 115 could be used to operate a visual indicator. An attendant noticing the visual indicator indicating a change in contour of the workpiece could then start the dresser manually by depressing a suitable starter button (not shown).

What is claimed is:

1. A system for automatically reshaping the grinding contour of a driven grinding wheel comprising a normally retracted dressing tool movable against the grinding contour of the grinding wheel, means operable to move and feed said dressing tool against said wheel, a body having a surface overlying the grinding contour of the grinding wheel and mounted for movement relative to said dressing tool toward the grinding contour of the grinding wheel, a source of constant pressure fluid in communication with the surface of said body and the contour of the wheel to maintain the surface spaced a predetermined distance from the contour of the wheel, said fluid pressure between the surface of said body and the grinding contour of the grinding wheel decreasing in response to wear of the latter, means responsive to an increase in the distance between the surface of said body and the grinding contour of the wheel to effect movement of said body to maintain said predetermined distance irrespective of decrease in the diameter of the wheel, and a pressure responsive control member responsive to a predetermined decrease in the fluid pressure between the surface of said body and the grinding contour of the wheel to activate said operable means.

2. A system as defined by claim 1 in which the pressure responsive control member responds at predetermined lower and upper pressure limits to respectively advance and retract said dressing tool.

3. A system as defined by claim 1 wherein said responsive means is a fluid pressure counterbalance in communication with said source of constant fluid pressure and operatively connected to said body.

4. A system as defined by claim 1 in which said pressure responsive control member responds to the mean of the fluid pressure at said port and the fluid pressure between said surface of said body and the grinding contour of the grinding wheel.

References Cited

UNITED STATES PATENTS

| 1,927,750 | 9/1933 | Mennesson | 51—165 |
|---|---|---|---|
| 2,647,347 | 8/1953 | Blanchette | 51—165 |
| 3,025,696 | 3/1962 | Matteson | 73—376 |
| 3,123,951 | 3/1964 | Kuris | 125—11 X |
| 3,155,086 | 11/1964 | Ornehage | 51—165 X |
| 3,344,657 | 10/1967 | Coes | 73—37.6 |

HAROLD D. WHITEHEAD, Primary Examiner

U.S. Cl. X.R.

51—165